(12) United States Patent
Kramer

(10) Patent No.: US 6,568,086 B2
(45) Date of Patent: May 27, 2003

(54) PIPE CUTTING APPARATUS

(75) Inventor: Herbert Kramer, Singen (DE)

(73) Assignee: Georg Fischer Rohrverbindungstechnik GmbH, Singen (DE)

( * ) Notice: Subject to any disclaimer, the term of this patent is extended or adjusted under 35 U.S.C. 154(b) by 7 days.

(21) Appl. No.: 09/817,665

(22) Filed: Mar. 26, 2001

(65) Prior Publication Data

US 2001/0023540 A1 Sep. 27, 2001

(30) Foreign Application Priority Data

Mar. 27, 2000 (DE) .......................... 100 14 777

(51) Int. Cl.[7] .......................... B23D 21/04; B23D 21/06
(52) U.S. Cl. ............................................. 30/97; 30/101
(58) Field of Search .............................. 30/102, 101, 97

(56) References Cited

U.S. PATENT DOCUMENTS 722,843 A  *  3/1903  Hopflinger .................... 30/97

FOREIGN PATENT DOCUMENTS

| DE | 921963 | 1/1955 |
|---|---|---|
| DE | 1171241 | 12/1964 |

* cited by examiner

*Primary Examiner*—Douglas D. Watts
(74) *Attorney, Agent, or Firm*—Bachman & LaPointe, P.C.

(57) ABSTRACT

A pipe cutting apparatus comprises at least one work-holding fixture and a cutting device pivotable about the axis of the pipe to be cut and having a cutting tool and drive. The cutting device is movable manually and/or by means of at least one transmission gearing for the feed of the tool about the pipe to be cut. The transmission gearing has a spur gear interacting with a crown gear.

4 Claims, 3 Drawing Sheets

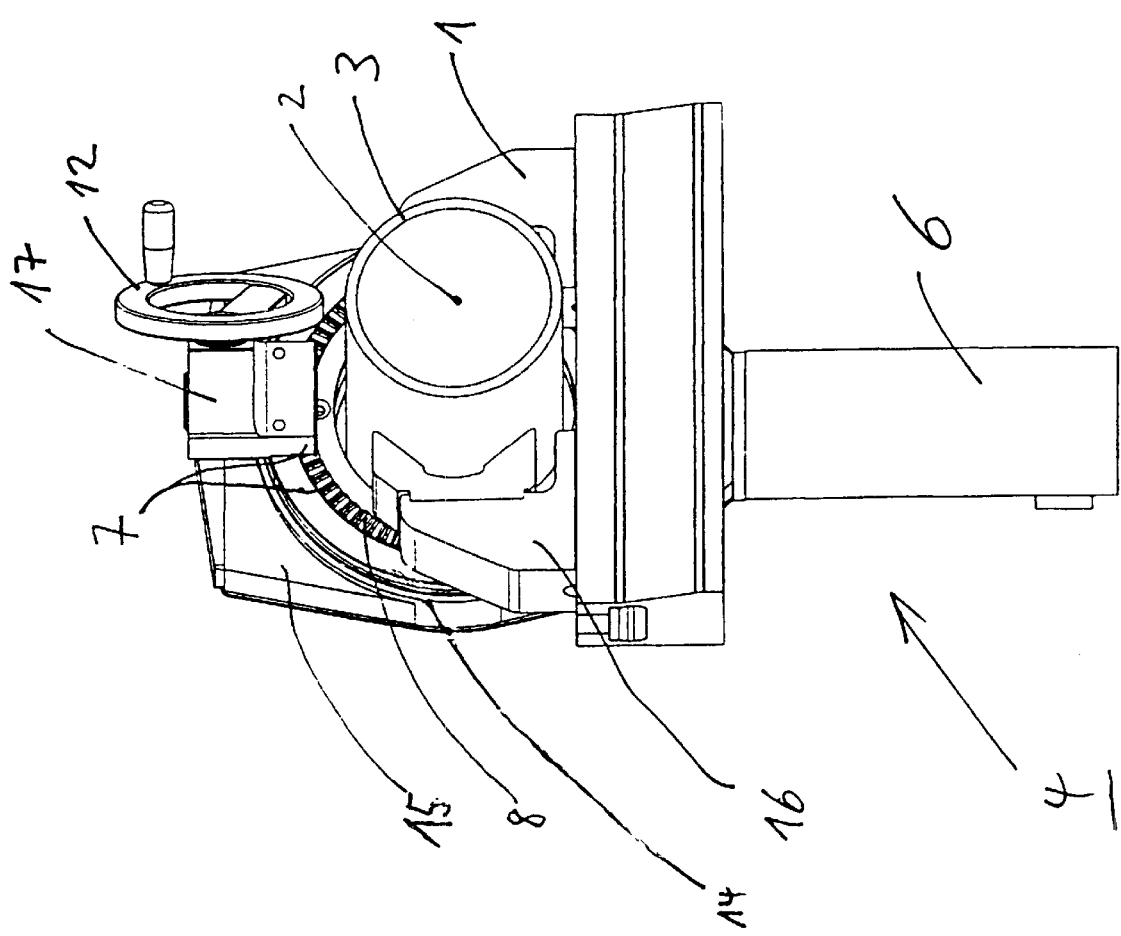

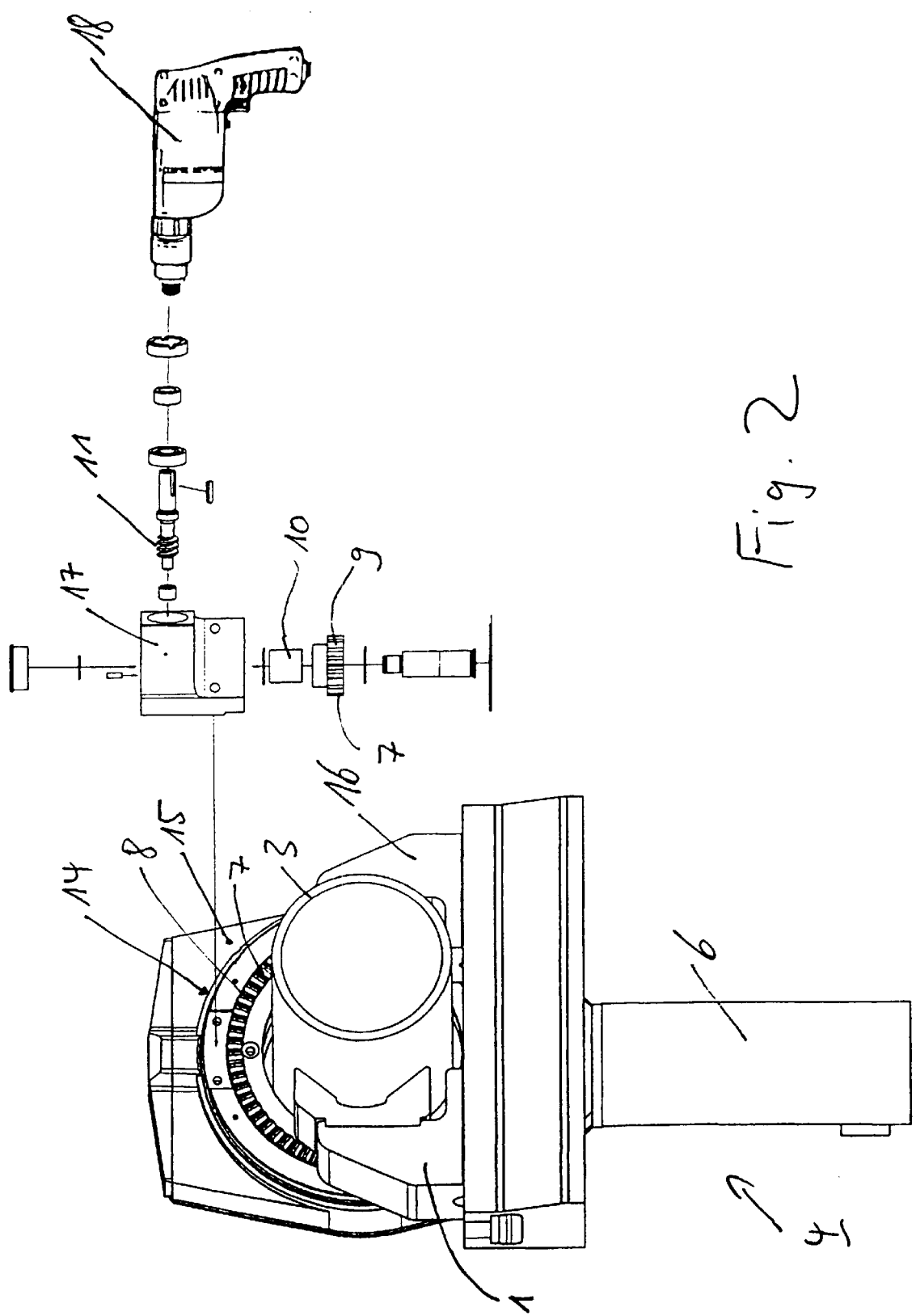

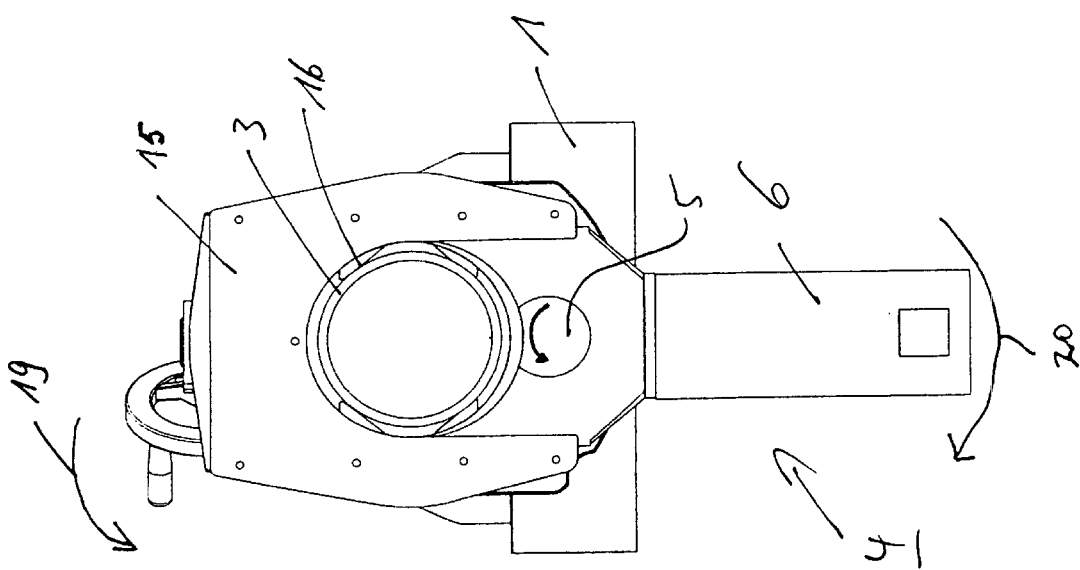

PIPE CUTTING APPARATUS

BACKGROUND OF THE INVENTION

The invention relates to a pipe cutting apparatus. DE-B 1 171 241 discloses a cutting apparatus having a fixed, concentrically acting work-holding fixture. This pipe cutting apparatus has a rotary body which can be rotated manually around the workpiece and has a cutting head carrying the disc-shaped, motor-driven cutting tool. During the pivoting movement of the rotary body, the cutting head is radially controlled by a lead cam arranged concentrically to the pipe axis.

Other, pipe cutting apparatuses are known in which the cutting device is guided about the pipe to be cut by means of a drive.

The safety aspects are a disadvantage of the known pipe cutting apparatuses. In particular in the case of large pipe diameters, with regard to both the pipe diameter and the wall thickness, larger drives and tools, which make the apparatus heavier, are required. For ergonomic reasons, manual actuation may therefore lead more easily to accidents or to damage to the tools and machines. Furthermore, it may be a disadvantage that the pipe cutting apparatus swings out in an uncontrolled manner in both directions.

Accordingly, it is a principle object of the invention to provide a pipe cutting apparatus which is safer than the prior art and wherein the actual operation for cutting the pipe can be carried out safely in a controllable manner.

SUMMARY OF THE INVENTION

The foregoing object is achieved by providing a pipe cutting apparatus having a transmission gearing which has a spur gear interacting with a crown gear. The use of a transmission ratio from the spur gear with the crown gear which is arranged on the rotary body travelling around the pipe to be cut results in a simple and compact solution to the abovementioned problems in terms of design.

In a preferred embodiment, a free-wheel mechanism is connected upstream of the spur gear. The free-wheel mechanism prevents an incorrect feed direction. It is only possible to work in the desired direction of the tool. The desired safety is achieved with this solution variant.

Worm gearing is advantageously connected upstream of the spur gear. The worm gearing offers an operationally safe locking function, in which case, for example, a manual movement of the drive and thus of the tool in an incorrect direction is prevented.

The processing operation can be effected via an actuating device, on the one hand, and mechanically via a drive motor, on the other hand, in which case the actuating device may be a crank handle, suitably arranged on the transmission gearing, or a handwheel.

The transmission gearing is preferably connected to the work-holding fixture in a fixed manner at the bearing holder for the rotary body mounted therein.

In addition, the transmission gearing can be connected in position in a pivotable or rotatable manner with respect to the work-holding fixture. Depending on spatial conditions, it is advantageous if the transmission gearing and thus the manual or mechanical drive are possible from various directions. To this end, an alternative possibility is for the transmission gearing to be provided with the actuating devices in such a way that it can be pivoted and then locked with respect to the bearing holder.

The drive of the transmission gearing is advantageously effected by means of a flexible shaft.

It is conceivable for the drive of the transmission gearing, instead of being directly coupled to the transmission gearing, to be attached to the workbench or to the fixed bearing holder, etc. In this case, the drive could be coupled to the transmission gearing via a flexible shaft, for example, or in another similar manner.

BRIEF DESCRIPTION OF THE DRAWINGS

An exemplary embodiment of the invention is shown in the figures wherein:

FIG. 1 shows a three-dimensional representation of the pipe cutting apparatus according to the invention, FIG. 2 shows the pipe cutting apparatus with free-wheel mechanism and worm gearing, and FIG. 3 shows a rear view of the pipe cutting apparatus.

DETAILED DESCRIPTION

The entire pipe cutting device is shown three-dimensionally in FIG. 1. A fixed bearing holder 14 which serves as a receptacle for the rotary body 15 is assigned to a work-holding fixture 1 firmly connected to a workbench or worktable top (not shown). A crown gear 8 is attached in the rotary body 15. Furthermore, the cutting device 4 is connected to the rotary body 15 in such a way as to be longitudinally movable. A slide (not shown) is guided in the rotary body in such a way as to be longitudinally movable, the longitudinal movement of the slide being effected via a lead cam (eccentric cam) in a manner known per se. The cutting device 4 essentially comprises the drive 6 and the cutting tool 5 shown in FIG. 3. The drive 6 with the tool 5 is mounted so as to be rotatable via the bearing holder 14 about the axis 2 of the pipe 3 to be cut, which is clamped in the clamping jaws 16. In a manner known per se via an eccentric cam, the tool 5 is guided by means of the slide to the workpiece 3 to be cut, as described, for example, in DE-B 1 171 241.

The housing 17 of the transmission gearing 7 is connected to the bearing holder 14 in a fixed or pivotable manner (not shown in the drawing). For the actuation, an actuating device 12, in this case designed as a crank handle, is connected to the spur gear 9 (not shown in FIG. 1) via gearing devices. The spur gear 9 engages in the crown gear 8 for the pivotable actuation of the cutting device 4.

The details in this exemplary embodiment are shown in FIG. 2, in which the housing 17 for the transmission gearing 7 is shown released from the bearing holder 14 for the crown gear 8. In addition to the spur gear 9, an upstream free-wheel mechanism 10 is located in the housing 17 for the transmission gearing. The free-wheel mechanism serves to prevent an incorrect feed direction of the cutting tool 5. Furthermore, worm gearing 11, which has a self-locking action for operational safety, is arranged in the housing 17 for the transmission gearing 7. As shown in FIG. 1, a hand actuating device 12 is provided with the worm gearing 11. A mechanical drive means, for example a cordless screwdriver 18, is shown in FIG. 2. The cordless screwdriver may be connected directly to the worm gearing 11. A connection via a flexible drive shaft (not shown) is also conceivable if the mechanical drive is provided at another location, for example for reasons of space.

The pipe cutting apparatus is shown from the rear in FIG. 3. The saw blade, as tool 5, is shown schematically. Several applications are possible through the use according to the invention of a free-wheel mechanism and worm gearing.

The actual cutting device 4 can be moved only in the desired direction of rotation, on the one hand via the actuating device 12 in arrow direction 19, or on the one hand directly by pivoting the drive 6, projecting downwards, in the desired direction. The opposite direction is prevented on account of the freewheel and the worm gearing. Depending on the application, it is nonetheless desirable to move the cutting device 4 in the opposite direction with respect to arrow 20. This is possible by suitable simultaneous actuation of the device 12 against arrow direction 19 and pivoting of the drive against arrow direction 20. Since synchronism of the movements is required for this purpose, an uncontrolled force cannot act on the rotary body 15, a factor which ensures additional safety.

For the sake of completeness, it should be mentioned that, instead of a sawing tool, abrasive cutting-off wheels or bevelling tools can also be used as the tools in this pipe cutting device according to the invention.

A sequence of operations is described below by way of example:

In the first step, a pipe to be treated is clamped in the clamping means. The dimensions are then set, i.e. the circle of action of the saw blade. After that, the drive 6 is switched on. The tool infeed is effected automatically via an eccentric cam. The feed movement may be effected manually via the actuating device 12 or in a motor-operated manner via a drive 18. Likewise, the feed movement, for example in the case of small pipe dimensions, may be effected by pulling on the drive 6. The hand actuating device is prevented from performing a following movement on account of the free-wheel mechanism 10.

After the cutting operation, the tool infeed is automatically retracted. The saw motor can be switched off.

The advantages achieved with the invention lie in particular in increased safety during the sawing operation.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A pipe cutting apparatus comprising achieving, at least one work-holding fixture for holding a pipe to be cut about an axis and a cutting device pivotable about the axis of the pipe, the cutting device has a cutting tool and drive, the cutting device being movable by means of at least one transmission gearing for the feed of the tool about the pipe to be cut wherein the transmission gearing has a spur gear interacting with a crown gear a free-wheel mechanism connected upstream of the spur gear, and wherein a worm gearing is connected upstream of the free-wheel mechanism wherein the transmitting gearing, the free-wheel mechanism and the spur gear are located in the housing.

2. A pipe cutting apparatus according to claim 1, wherein the transmission gearing is driven manually via an actuating device.

3. A pipe cutting apparatus according to claim 1, wherein the transmission gearing is driven mechanically.

4. A pipe cutting apparatus according to claim 1, wherein the transmission gearing is connected to the work-holding fixture in a fixed manner.

* * * * *